Sept. 16, 1952     E. J. F. MURANA     2,610,376
CABLE FITTING
Filed Nov. 25, 1949
Fig.1
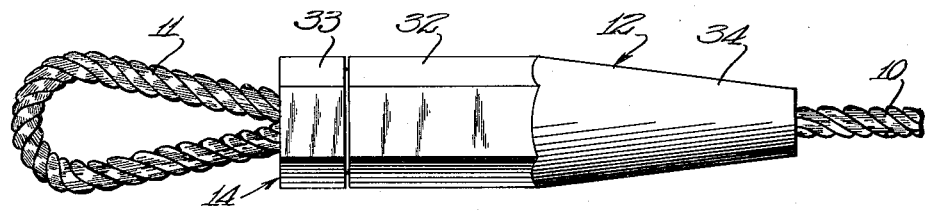
Fig.2
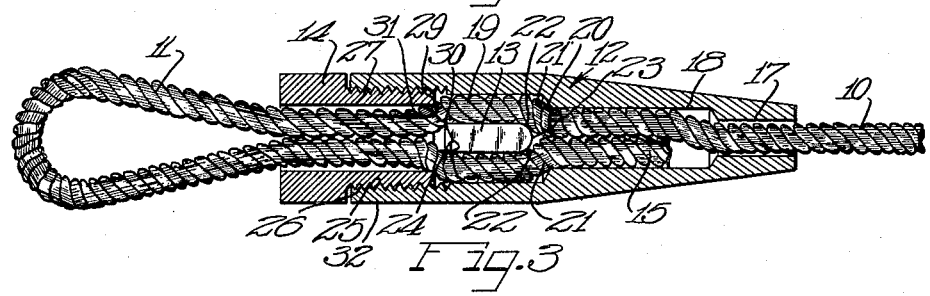
Fig.3
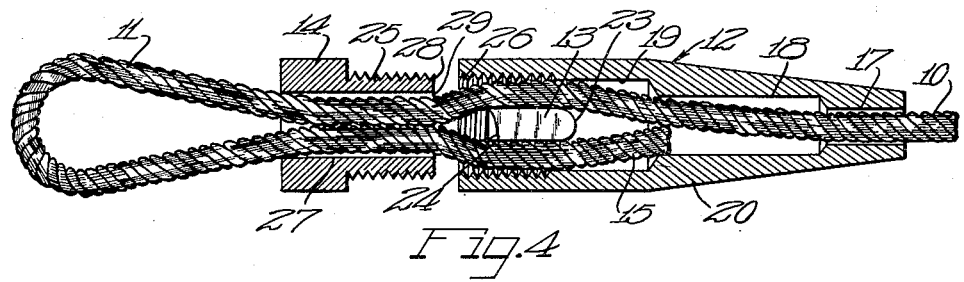
Fig.4
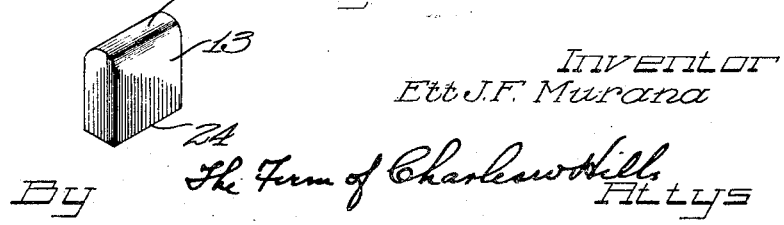
Fig.5
Inventor
Ett J. F. Murana
By The Firm of Charles W. Hill
Attys Patented Sept. 16, 1952

2,610,376

UNITED STATES PATENT OFFICE 2,610,376

CABLE FITTING

Ett J. F. Murana, Algonquin, Ill.

Application November 25, 1949, Serial No. 129,347

3 Claims. (Cl. 24—125)

1

The present invention relates to improvements in cable fittings and more particularly concerns fittings of the type sometimes referred to as guy clamps or cable end connectors and arranged to provide for the anchoring or attachment of a cable terminal portion to an object or anchoring device.

Cable fittings of this kind have heretofore been characterized by fairly complex structures or structures which of necessity have required larger size cables to be used than necessary for various purposes by reason of the difficulty in properly permanently gripping the cable to maintain an eye in the terminal portion thereof or to otherwise anchor the end of the cable. Most prior cable clamps and like devices have relied upon the holding power of screws to maintain a hold upon the cable with attendant liability to loosening, stripping or other failure.

An important object of the present invention is to provide an improved cable terminal securing device in which the strain or stress in service is transmitted to and withstood by a solid body member of the fitting.

Another object of the invention is to provide a cable terminal fitting in which the cable is encompassed within a one-piece rugged fitting member.

A further object of the invention is to provide a cable terminal fitting which so grips the cable that stresses and strains on the cable actually increase the grip of the fitting on the cable.

Still another object of the invention is to provide a cable terminal fitting which is especially suitable for use with small size cables and which will enable smaller sizes of cable to be employed where due to the limitations of available prior fittings larger cables were required.

A still further object of the invention is to provide a cable fitting which comprises a minimum number of parts that can be made by inexpensive mass production methods of manufacture.

Other objects, features and advantages of the present invention will be readily apparent from the following detailed description of certain preferred embodiments thereof, taken in conjunction with the accompanying drawings in which:

Figure 1 is a side elevational view of a cable fitting embodying the features of the present invention;

Figure 2 is a longitudinal sectional view as though taken in a vertical plane through the fitting of Figure 1;

Figure 3 is a longitudinal sectional view through

2 the fitting showing the same in a preliminary stage in the assembly of a cable therewith, Figure 4 is a modified form of the fitting disclosing the use of a dead end head or plug therewith; and Figure 5 is an isometric view of the anchoring wedge used in the fitting.

Having reference first to Figures 1, 2, 3 and 5, a cable terminal fitting is shown of the kind also referred to as a guy clamp wherein the terminal portion of a cable 10 is secured into and retained to provide a loop or eye 11. To this end the fitting comprises a novel construction including a one-piece solid tubular body member 12, a wedge or snubber block 13, and a securing or drive plug 14. Each of the three components of the fitting is of such structure that it can be made from suitable metal stock by low cost mass production methods of manufacture. For example, the body member 12 and the plug member 14 can be made in a screw machine. The snubber or wedge block 13 can be formed by simply cutting it from appropriate bar stock.

The fitting body 12 is of adequate length to receive an end extremity portion 15 of the cable turned back upon the body of the terminal portion of the cable within the fitting body. For this purpose, the elongated fitting body has an axial bore 17 opening through one end thereof and of a diameter which is large enough to clear the body of the cable 10 therethrough freely but preferably with not too great a clearance. Inwardly a short distance from the tip or end through which the bore 17 opens, an enlarged axial intermediate bore portion 18 is provided of a diameter to receive in close though not necessarily binding relation the juxtaposed body portion of the cable 10 and the extremity portion 15 of the cable. At what may be approximately the longitudinal center of the body member 12 the bore is again increased in diameter to provide an enlarged coaxial counterbore 19 which opens through the opposite end of the body. At juncture of the counterbore 19 with the intermediate bore portion 18 is provided a relatively abrupt shoulder 20 which is preferably formed on a taper toward the intermediate bore portion so as to facilitate reception of the return bent cable end and also to provide an efficient ledge or clamping shoulder against which the cable is retainingly secured by action of the wedge or snubber block 13. It will be observed that the shoulder 20 is defined by an inner cable-kinking edge at the entrance to the smaller diameter bore portion 18.

Retention of the cable terminal portion in the body member 12 is effected by driving the wedge or snubber block 13 between the body portion of the cable 10 within the counterbore 9 and the return directed extremity portion 15 of the cable within the counterbore 19 and longitudinally to kink the engaged portions of the cable against the shoulder 20 and upon the inner edge thereof as seen in Figure 2. This forms generally complementary shoulders 21 in the cable portions opposing the fitting shoulder 20 and opposite shoulders 22 on the cable portions opposing the driving tip of the snubber member 13. For this purpose the snubber or wedge block 13 is preferably formed as a flattened member having opposite substantially parallel broad faces and narrower substantially parallel longitudinally elongated side surfaces. The distance between the broad faces defines the narrowest dimension of the block for freely accommodating portions of a cable between said faces and the counterbore wall, but of sufficient thickness to occupy substantially the space between the engaged portions of the cable when the cable portions are spread apart to engage the respectively opposite sides of the counterbore 19. The width of the block 13 is such that when the block is operatively disposed extending endwise within the counterbore the side surfaces extend substantially equal to the diameter of the counterbore so as to maintain the block against cocking but substantially centered in the counterbore 19 and free to move without restraint longitudinally of the counterbore. At its forward or driving end the block 13 is preferably blunt and formed with a driving nose 23 which may be wedge shaped or of curvate form as shown. This facilitates the kinking action of the driving nose during assembly. At its rear end, the wedge or snubber block 13 is blunt and preferably squared off to provide relatively sharp corners 24 which will resist slippage of the cable forwardly past the snubber block.

In effecting assembly of the cable within the fitting, the plug member 14 performs the important function of driving the cable and the components of the fitting into the retaining clamping interengagement by which the terminal portion of the cable and the fitting are effectively secured together with such thoroughness that the assembly will withstand strains of a magnitude to break the cable without causing release of the cable from the fitting. To this end, the plug member 14 includes a reduced diameter portion 25 which is threaded appropriately to engage threadedly within an internally threaded end portion 26 of the large bore section 19 of the fitting body. An axial bore 27 through the plug member 14 affords a passage through which the cable portions at the base of the eye or loop 11 are threaded, in the same sense that a piece of thread is threaded through a needle eye, by extending the cable endwise through the plug from the reduced diameter end portion thereof and then bending the cable terminal portion upon itself and threading the cable extremity back through the bore passage 27 to the desired extent. The diameter of the plug passage bore 27 is such that the two portions of the cable are held in substantial juxtaposition without binding so that the plug 14 can be readily turned about its axis relative to the cable.

Preliminary assembly of the components of the fitting and the cable terminal portion is effected substantially as shown in Figure 3. First, the end of the cable is passed through the fitting body 12 from the small bore end thereof, and then the cable end is extended through the bore passage 27 in the plug member 14. Thereafter, the terminal portion of the cable is bent upon itself and the end of the cable is returned through the bore passage 27 while the loop or eye portion 11 is maintained. The extremity portion 15 of the cable is projected beyond the plug member 14 a sufficient distance to receive between the terminal portion and the adjacent body portion of the cable in substantially straddling relation the snubber block 13, with the tip of the cable extending beyond the tip of the snubber block a distance sufficient to assure entry of the tip of the cable into the intermediate bore portion 18 in the fitting body as the cable and snubber block are moved axially into the fitting body.

After relative assembly movement of the fitting body and the cable with the remaining components has progressed as far as manual effort can accomplish assembly, limited by reason of the extremity portion 15 of the cable and the adjacent body portion of the cable becoming substantially bound against the shoulder 20 within the fitting body due to spreading apart of the cable portions by the snubber block 13, the driving and securing plug 14 is threaded into the threaded end portion 26 of the bore section 19. As the plug 14 is driven into the enlarged bore section 19, a driving tip 28 on the inner end of the block drives against the opposing shoulders defined by the cable where the snubber block straddling portions of the cable pass about the outer end of the snubber block 13 and converge into the passage bore 27 of the driving plug.

To facilitate gripping the cable, the driving tip or nose 28 is preferably formed with a relatively sharp cable gripping edge 29 at the adjacent mouth of the passage bore 27. As a result, as the plug 14 drives into the cable fitting body 12 the converging portions of the cable gripped by the gripping edge 29 are gradually driven longitudinally into the fitting body and thus the cable, the snubber block 13 and the fitting body 12 are relatively moved longitudinally until the portions of the cable at the nose 23 of the snubber block 13 are pinched and kinked and thus thoroughly clamped between the snubber block nose and the fitting body shoulder 20. Coincident with the snubbing of the cable at the nose of the snubber block 13, the converging portions of the cable against which the driving edge 29 of the plug is working are crimped and clamped against the shoulder edges 24 at the rear or outer end of the snubber block 13. The completed assembly is then substantially as shown in Figure 2 with shoulders 30 of the kinked and permanently set cable opposing and interengaging retainingly with the snubber block shoulder edges 24 and outside shoulders 31 opposing the driving edge 29 of the driving and securing plug.

Since the cable portions are permanently set in the snubbed shoulder areas thereof at both ends of the snubber block 13, and the snubber block 13 prevents straightening of the cable irrespective of the tension that may be exerted upon the cable at either end of the fitting assembly, the cable is held quite effectively against slipping or displacement longitudinally of the coupling or fitting in either longitudinal direction. Moreover, the principal strain of the cable within the fitting is imposed against the shoulder 20 on the fitting body so that the driving plug 14 is substantially relieved of longitudinal stresses which might tend to react detrimentally upon the securing threads of the plug and the fitting body. This decided advantage accures from the fact that in service the principal stress on the cable will be in the body strand or stretch thereof causing the snubber block 13 normally to be drawn by the kinked portion of the body stretch of the cable about the snubber block toward the shoulder 20 within the fitting body and thus the greater the stress on the cable the more thorough the snubbing action not only upon the body stretch of the cable but also upon the extremity portion 15 against which the snubber block 13 drives with equal effect.

In order to facilitate assembly of the fitting components, both the body member 12 and the plug member 14 may be formed with appropriate external vise or wrench faces 32 and 33, respectively, which may conveniently be provided by forming the body and plug components from appropriate hexagonal or other polygonal cross section bar stock. If desired, the forward end portion of the fitting body 12 may be tapered as indicated at 34.

Where instead of a loop or eye in the end of the cable, a dead end fitting is desired, the modification shown in Fig. 4 may be employed which, except for the plug component of the device is the same as the fitting described in connection with Figures 1 to 3. The same reference numerals are therefore employed in Figure 4 to designate elements which are identical with the first-described form of the invention.

In the modification, a dead end plug 35 is provided which has a solid reduced diameter nose portion 37 threaded and thereby interengaged with the threads 26 to work it in cable snubbing relation into the enlarged bore section 19 of the fitting body 12. The remainder or outer end portion of the plug 35 is formed with an eye head 38 or other preferred connector formation and has a wrench face shoulder formation 39 intermediate the head 38 and the driving nose portion 37.

In assembling the fitting according to Figure 4 with a cable 10' the terminal portion of the cable is extended through the fitting body 12 from the reduced diameter bore 17 end thereof, and the extremity portion of the cable looped about the snubber block 13 with an extremity section 15' of the cable extending into the intermediate bore section 18 of the fitting body. Then the plug 35 is threaded into the threads 27 within the enlarged bore portion of the body and screwed down against the terminal loop 11' of the cable until the cable loop has been permanently kinked and set about the snubber block 13 and against the shoulder 20. As a result, the cable is effectively secured within the fitting and the attachment head 38 can be anchored to whatever apparatus or other anchorage desired to which the cable is to be attached.

It will be understood that modifications and variations may be effected without departing from the scope of the novel concepts of the present invention.

I claim as my invention:

1. In a cable terminal fitting, a tubular fitting body having an axial bore comprising a rear counterbore joining a forward smaller diameter bore portion on an abrupt shoulder defined by a cable-kinking edge at the entrance to the smaller diameter bore portion, a flattened snubber block having opposite substantially parallel broad faces and narrower substantially parallel longitudinally elongated side surfaces, said block extending endwise within said counterbore and being of a width substantially equal to the diameter of the counterbore so as to be held against cocking while being free for endwise movement, the distance between said broad faces defining the narrowest dimension of the block for freely accommodating portions of a cable between said faces and the counterbore wall, said block having a blunt forward end to oppose said shoulder to kink and set upon said edge a cable body and cable terminal between which the block is disposed in said counterbore, said block having a blunt rear end with abrupt cable-kinking edges, said counterbore being internally threaded adjacent its rear end, and a threaded drive plug arranged to be threaded down into said counterbore and having a blunt end opposing said kinking edges of the snubber block so that portions of the cable will be kinked and set against said edges at the same time that the cable is being kinked and set upon said shoulder edge as an incident to driving said plug hard toward said block when the fitting is assembled with a cable.

2. A cable terminal fitting as defined in claim 1 wherein said plug has an axial cable bore defined at its inner end by a cable kinking edge cooperatively related to said kinking edges of the snubber block.

3. A cable terminal fitting as defined in claim 1 wherein said plug is solid except for a transverse eye opening in its rear end portion.

ETT J. F. MURANA.

REFERENCES CITED

The following references are of record in the file of this patent:

UNITED STATES PATENTS

| Number | Name | Date |
|---|---|---|
| 341,101 | Frederick | May 4, 1886 |
| 421,328 | Strohbach | Feb. 11, 1890 |
| 779,469 | Dossert | Jan. 10, 1905 |
| 1,167,474 | Benjamin | Jan. 11, 1916 |
| 1,355,857 | Smiley | Oct. 19, 1920 |
| 1,958,748 | Fiege | May 15, 1934 |
| 2,337,895 | Jaszczak | Dec. 28, 1943 |

FOREIGN PATENTS

| Number | Country | Date |
|---|---|---|
| 2,464 | Great Britain | Feb. 15, 1890 |